Figure 1:
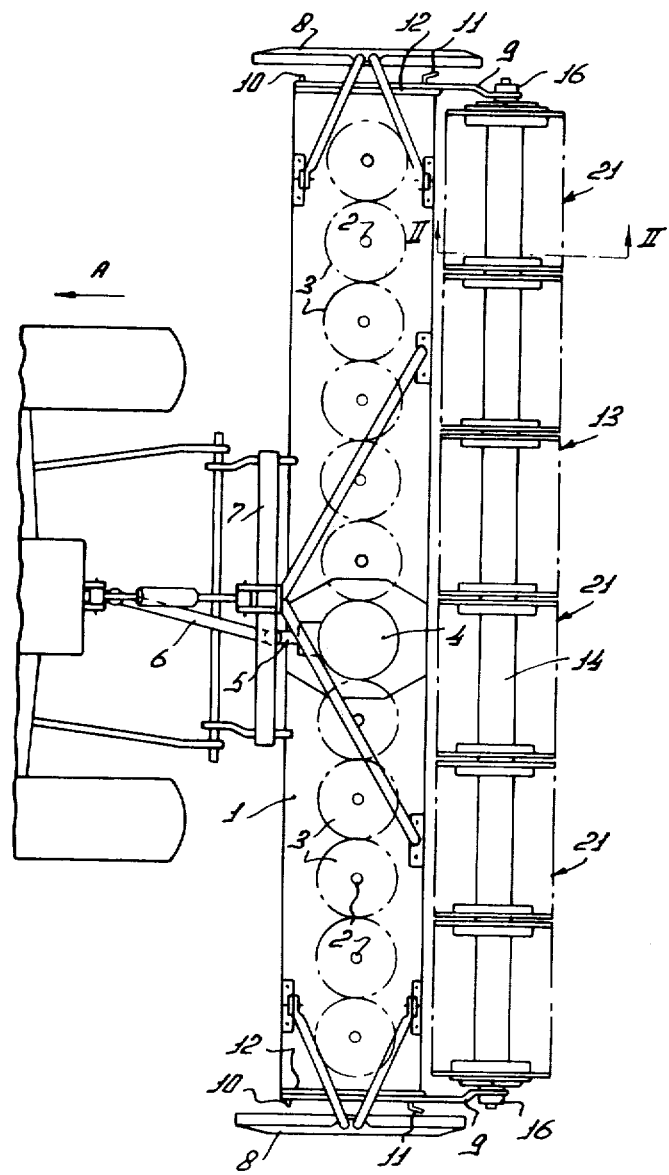

United States Patent [19]
van der Lely

[11] 3,897,830
[45] Aug. 5, 1975

[54] SOIL CULTIVATING IMPLEMENTS AND SUPPORTING ROLLERS

[76] Inventor: Cornelis van der Lely, 7, Brushchenrain, Zug, Switzerland

[22] Filed: Apr. 11, 1973

[21] Appl. No.: 350,197

[52] U.S. Cl. .................... 172/68; 172/59; 172/177; 172/547
[51] Int. Cl. ............................................. A10b 33/16
[58] Field of Search ......... 172/59, 63, 68, 149, 151, 172/174, 177, 519, 540, 547, 548, 552

[56] References Cited
UNITED STATES PATENTS

| 166,597 | 8/1875 | Evans | 172/552 X |
|---|---|---|---|
| 200,327 | 2/1878 | Moore | 172/552 X |
| 922,505 | 3/1909 | Porter | 172/552 |
| 2,472,386 | 6/1949 | Schmeiser | 172/177 X |
| 2,657,619 | 11/1953 | Gilreath | 172/149 X |
| 3,338,315 | 8/1967 | Ketel | 172/548 X |
| 3,774,688 | 11/1973 | van der Lely et al | 172/39 |
| 3,774,689 | 11/1973 | van der Lely et al | 172/776 X |

*Primary Examiner*—Edgar S. Burr
*Assistant Examiner*—Paul T. Sewell
*Attorney, Agent, or Firm*—Mason, Mason & Albright

[57] ABSTRACT

A rotary harrow has rotary soil working members mounted on a frame portion and a rotatable supporting member pivotally connected to the rear of the frame portion. The frame portion is elongated and extends transverse to the direction of travel. The supporting member has a central tube-like support that coextends horizontally with the frame portion. The outer circumference of the member engages the ground and is movable towards and away from the tube-like support so that mud and sticky soil will not clog the support during operation. The circumference can be formed of a single or a plurality of movable elements and parts that are displaceable relative to the tube-like support during travel. The tube-like support is connected to the frame with arms that are adjustably connected to the frame portion to regulate the working depths of the soil working members.

11 Claims, 18 Drawing Figures

SOIL CULTIVATING IMPLEMENTS AND SUPPORTING ROLLERS

This invention relates to soil cultivating implements, in particular to rotary harrows, such implements being of the kind comprising a plurality of soil working members and a rotary supporting member by which the implement is sustained from the ground during its use, said rotary supporting member including a central or substantially central support. When known implements of this kind operate on wet or stickly soil, the rotary supporting member frequently becomes clogged and/or coated with mud and the like to an extent such that it can no longer be relied upon correctly to fulfil its supporting function and/or the operating depth control function which it usually also serves.

According to the invention, there is provided an implement of the kind set forth wherein the circumference of the rotary supporting member includes at least one part that is movable relative to said central or substantially central support during the use of the implement.

Figure 2:
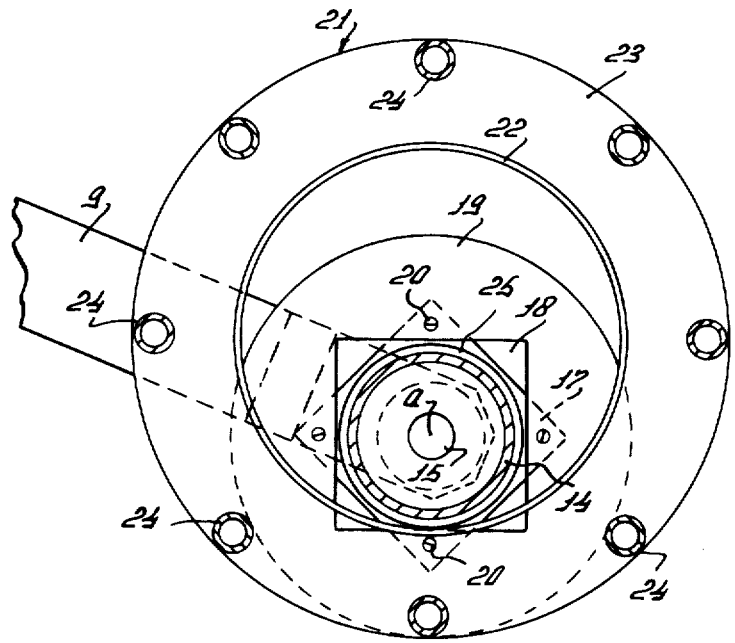
Figure 3:
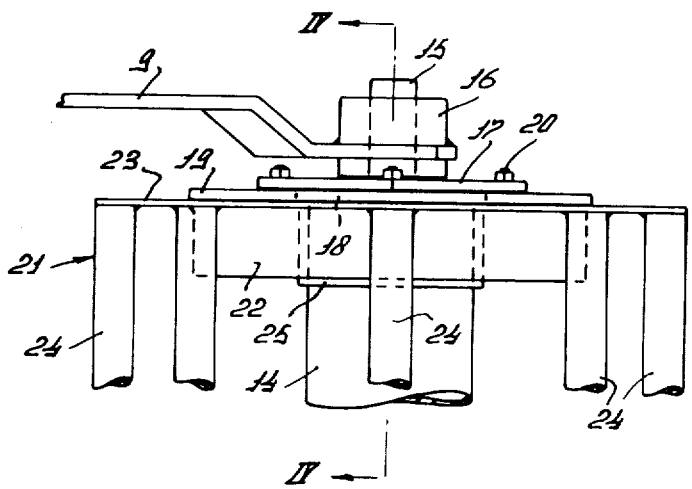
Figure 4:
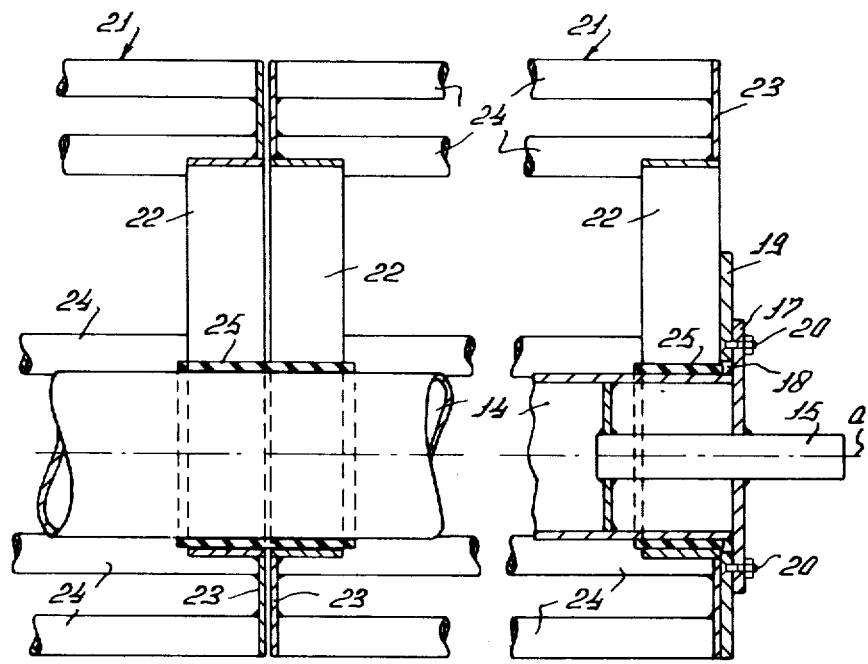
Figure 6:
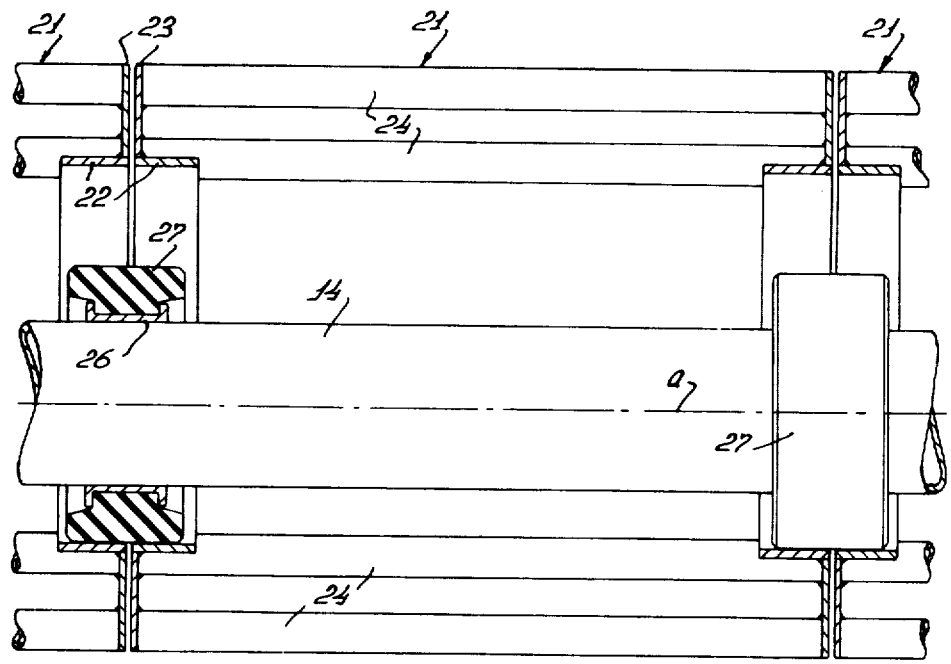
Figure 7:
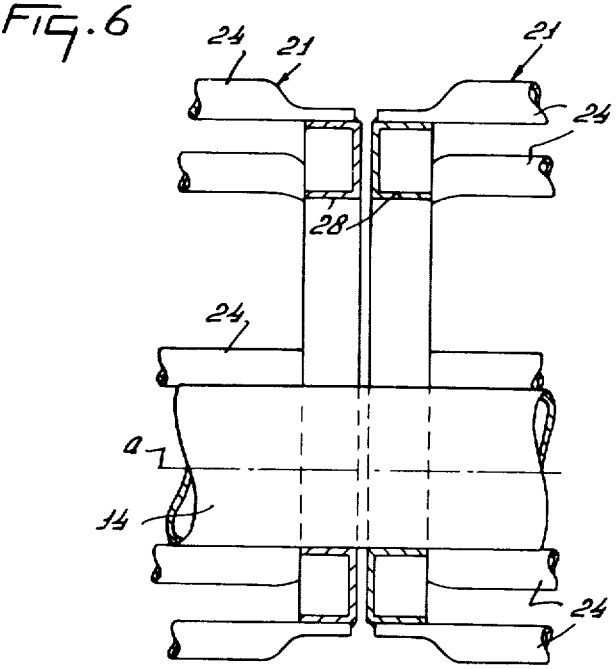
Figure 8:
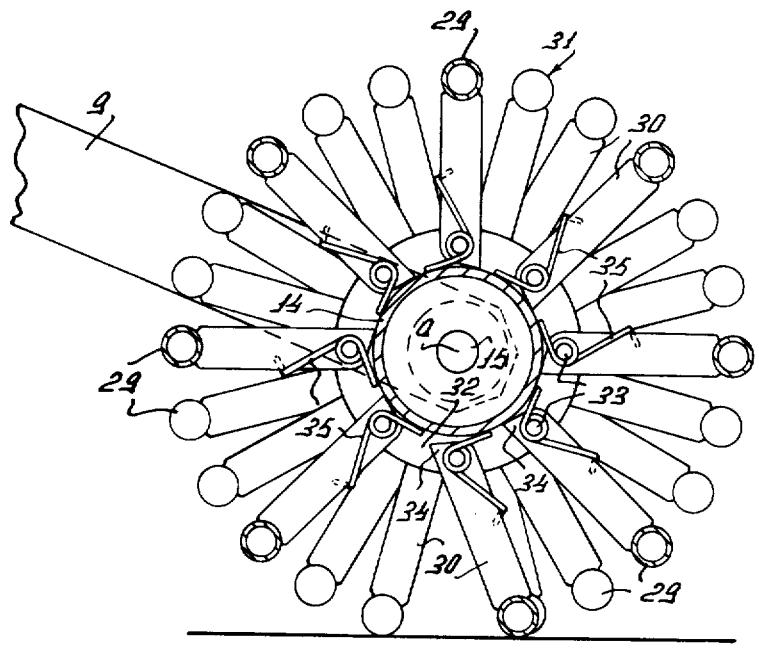
Figure 9:
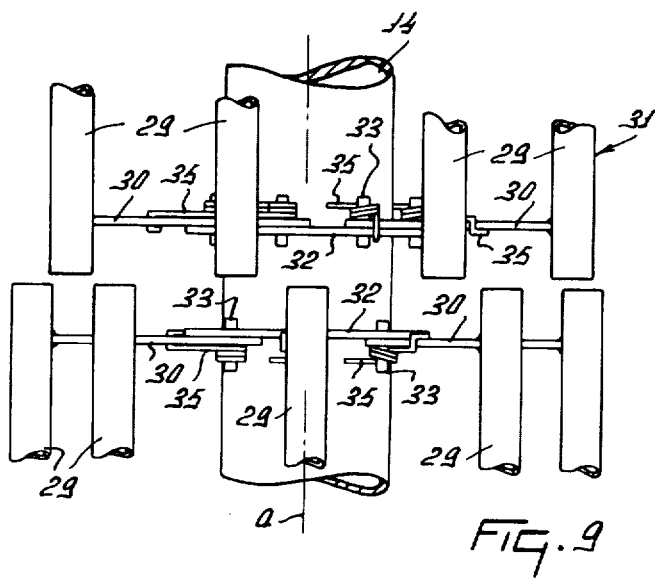
Figure 10:
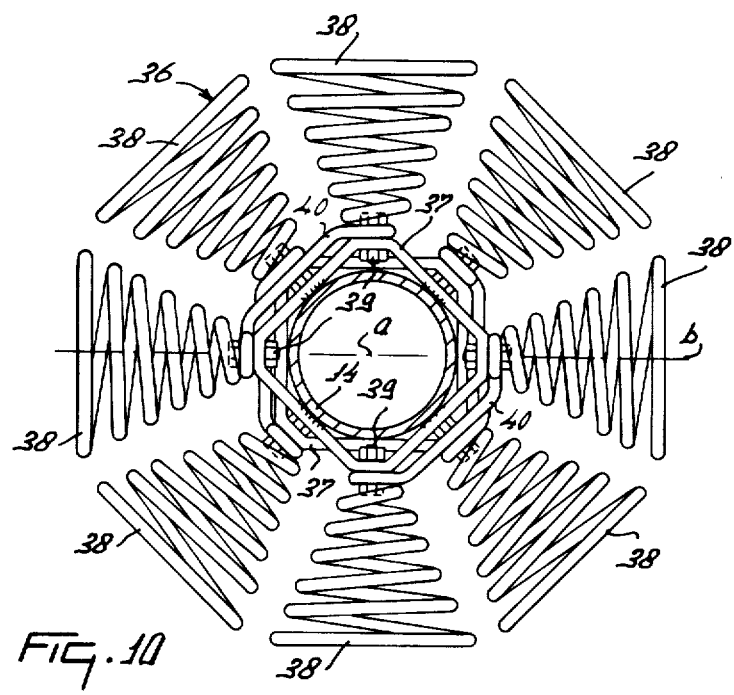
Figure 11:
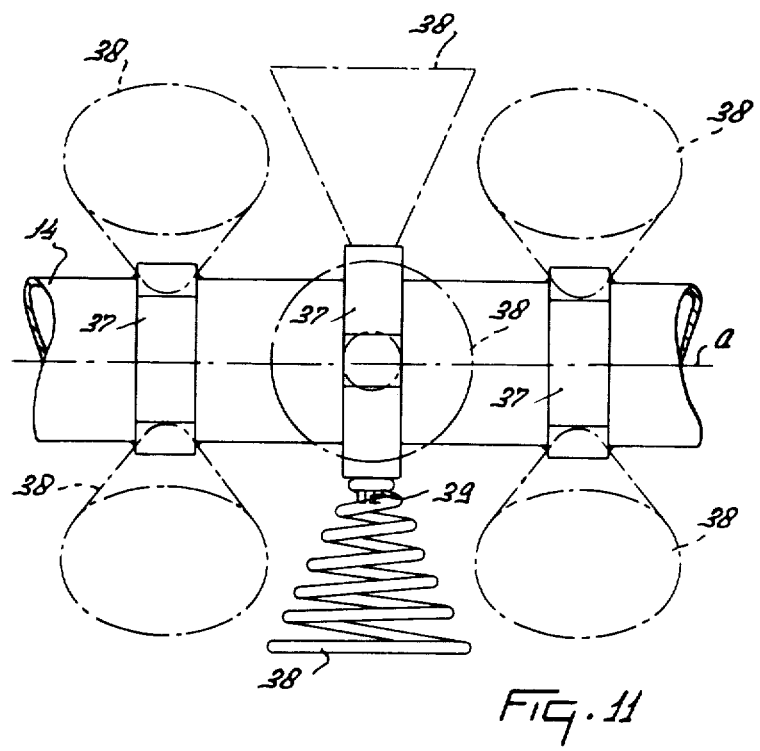
Figure 12:
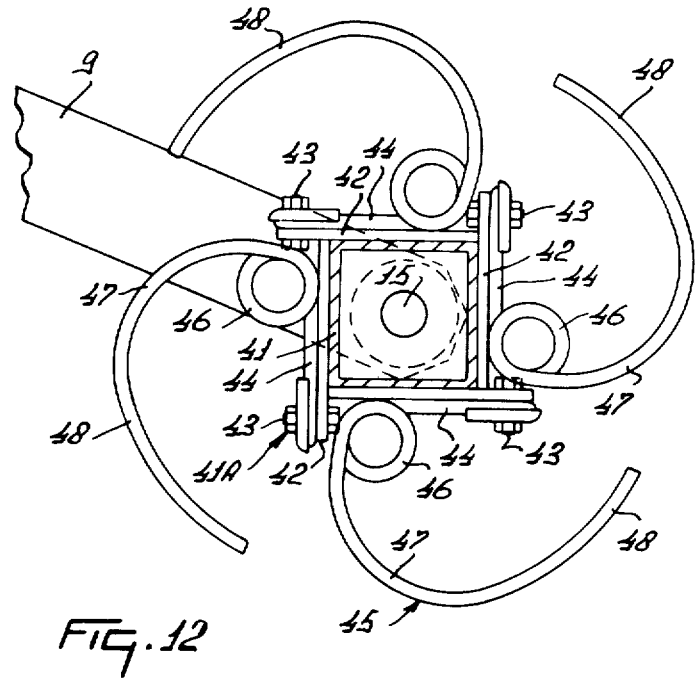
Figure 13:
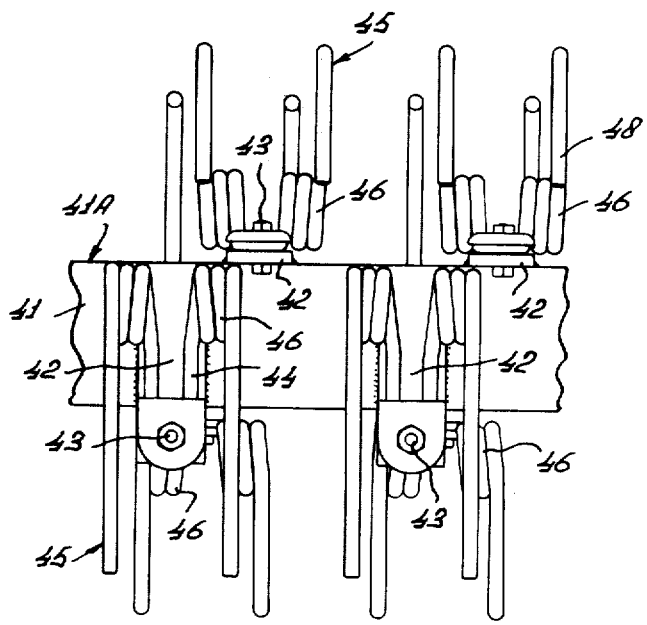
Figure 14:
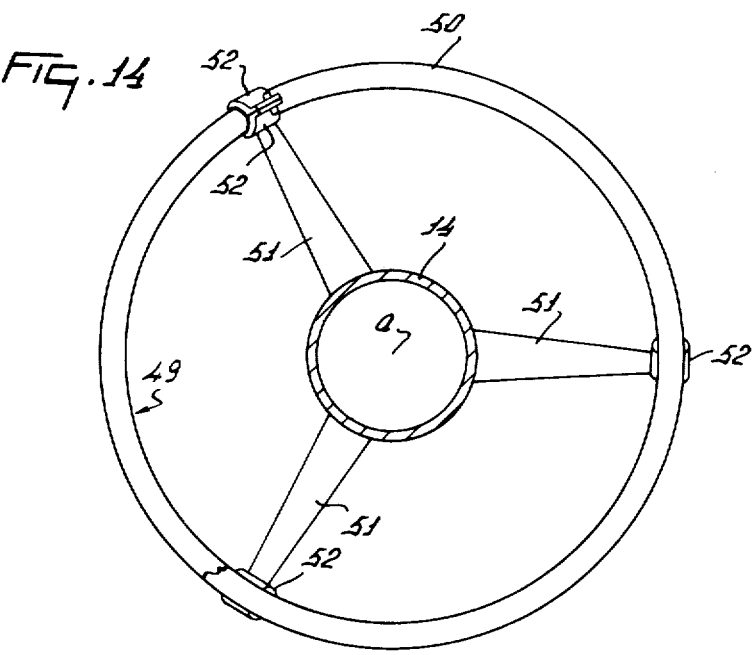
Figure 15:
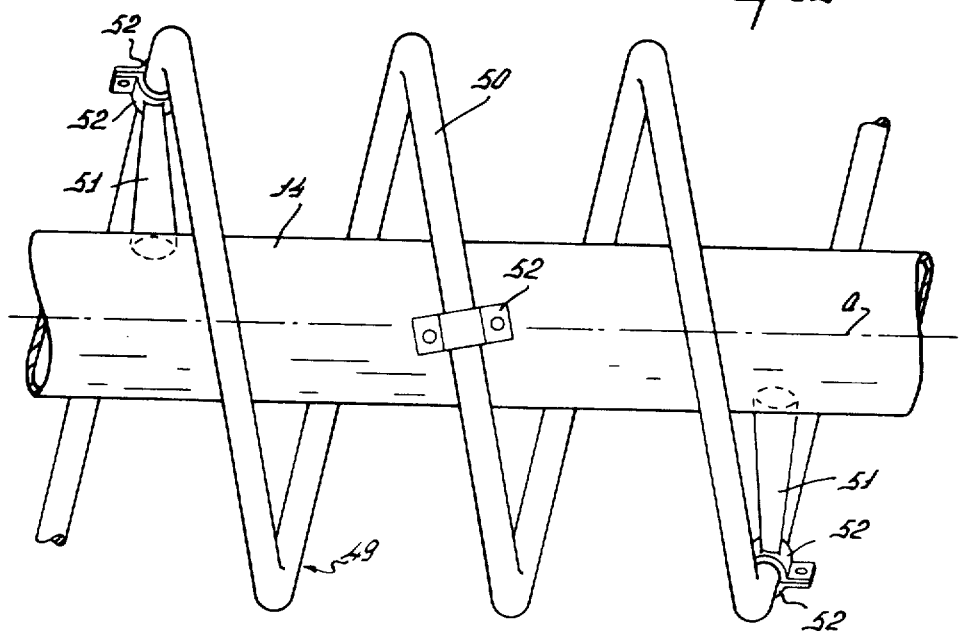
Figure 16:
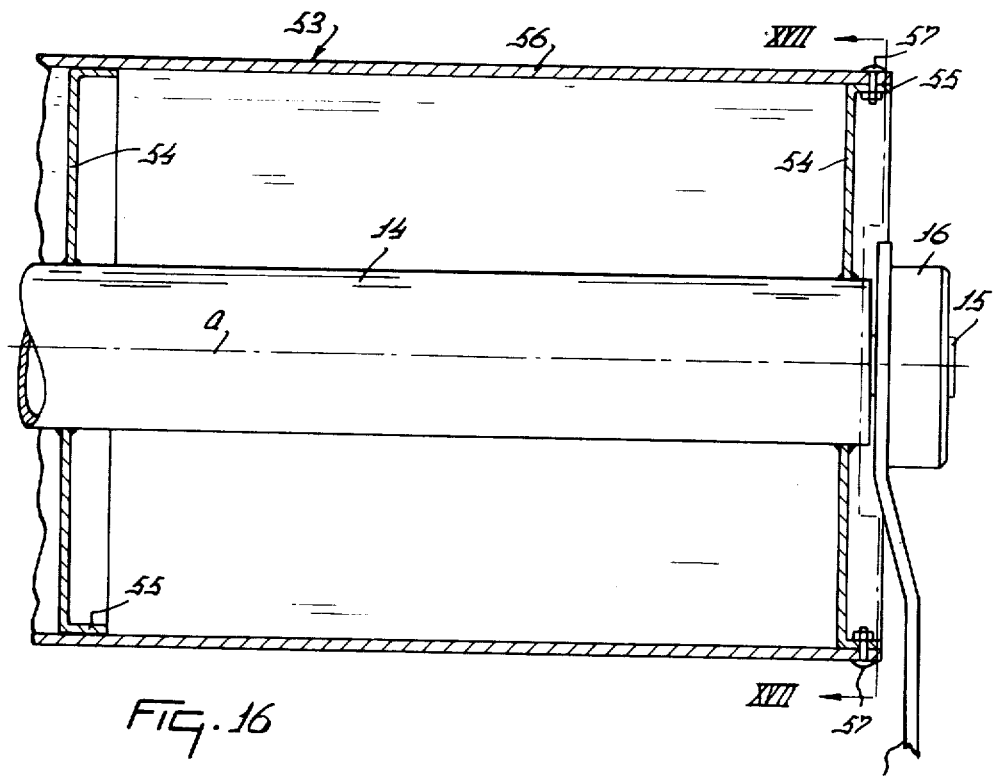
Figure 17:
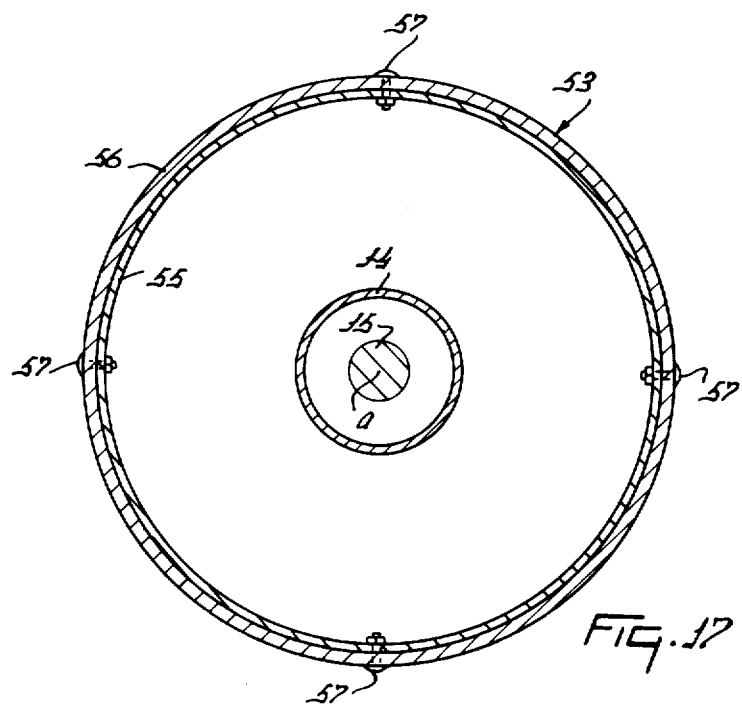
Figure 18:
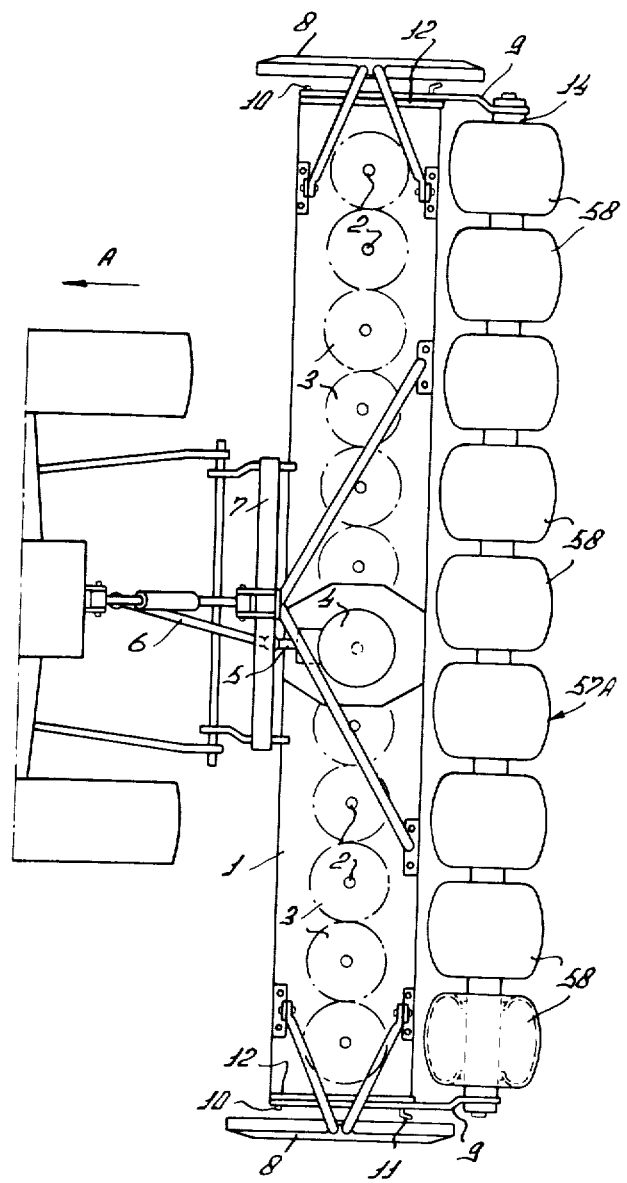

For a better understanding of the invention, and to show how the same may be carried into effect, reference will now be made, by way of example, to the accompanying drawings, in which:

FIG. 1 is a plan view of an implement in accordance with the invention connected to the rear of an agricultural tractor, FIG. 2 is a cross-section, to an enlarged scale, taken on the line II—II of FIG. 1, FIG. 3 is a plan view, to an enlarged scale, showing one end of a rotary supporting member of the implement of FIGS. 1 and 2 of the drawings in further detail, FIG. 4 is a section taken on the line IV—IV of FIG. 3, FIGS. 5, 6 and 7 are all similar views to FIG. 4 but show three different constructions, FIG. 8 is a transverse section illustrating a rotary supporting member of an alternative construction, FIG. 9 is a partial elevation corresponding to FIG. 8, FIG. 10 is a transverse section of a further alternative construction of rotary supporting member, FIG. 11 is a partial elevation corresponding to FIG. 10, FIG. 12 is a transverse cross-section through a further alternative construction of rotary supporting member, FIG. 13 is a partial elevation corresponding to FIG. 12, FIG. 14 is a transverse cross-section through a further alternative rotary supporting member, FIG. 15 is a partial elevation corresponding to FIG. 14, FIG. 16 is a scrap sectional elevation illustrating the construction at one end of a further alternative form of rotary supporting member, FIG. 17 is a section taken on the line XVII—XVII of FIG. 16, and FIG. 18 is a plan view illustrating an implement in accordance with the invention in the form of a rotary harrow connected to the rear of an agricultural tractor, said implement having a rotary supporting member of a different construction to that illustrated in FIG. 1.

Referring to FIGS. 1 to 4 of the drawings, the implement that is illustrated has a frame portion 1 of generally hollow box-like configuration which extends substantially horizontally perpendicular to the intended direction of operative travel of the implement which is indicated by an arrow A in FIG. 1 of the drawings. A plurality, such as twelve, of tined soil working members (not shown in the drawings) are carried beneath the frame portion 1 so as to be rotatable about the axes of corresponding upwardly extending, and normally substantially vertical, shafts 2 that are disposed in a single row at regularly spaced apart distances of substantially 25 centermeters. The shafts 2 are rotatably supported from the frame portion 1 by substantially vertical bearings and each shaft carries, inside the hollow frame portion 1, a corresponding straight- or spur-toothed pinion 3, the pinions 3 being arranged in such a way that the teeth of each of them are in mesh with those of its neighbour or both of its neighbours in the row. The shaft 3 corresponding to one of the center pair of rotary soil working members has an upward extension which is located inside a gear box 4 and meshing bevel pinions carried by said extension and by a rotary input shaft 5 that projects forwardly from the gear box 4 in substantially the direction A enable rotation imparted to the shaft 5 to be transmitted to all of the soil working members in such a way that each soil working member revolves in the opposite direction to its neighbour or both its neighbours.

The front of the frame portion 1 with respect to the direction A is provided with a generally triangular coupling member 7 arranged for connection to the three-point lifting device or hitch of an agricultural tractor or other operating vehicle in the manner that can be seen in outline in FIG. 1 of the drawings. The splined or otherwise keyed leading end of the rotary input shaft 5 is placed in driven connection with the power take-off shaft of the same tractor or other operating vehicle by way of an intermediate telescopic transmission shaft 6 of known construction having universal joints at its opposite ends. Two substantially vertical plates 8 are arranged just beyond the opposite ends of the single row of twelve soil working members and are connected by arms to pivotal mountings on top of the frame portion 1, said pivotal mountings defining substantially horizontal axes that extend substantially parallel to the direction A. The plates 8 are shaped to slide over the ground surface during the use of the implement and their pivotal mountings allow them to move upwardly and downwardly to some extent to match undulations in the surface of the soil over which the implement travels. The plates 8 serve to minimise the formation of ridges at the opposite edges of the strips of soil that are worked by the implement and to reduce the number of stones and other potentially dangerous objects that are flung laterally of the implement by the rapidly rotating tined soil working members when the implement is in operation. When the implement is undergoing inoperative transport, the plates 8 can be turned upwardly through substantially 180° about their pivotal connections to the frame portion 1 to lie in inverted inoperative positions on top of that frame portion.

The opposite lateral ends of the frame portion 1 are provided with arms 9 that extend rearwardly from the frame portion with respect to the direction A. The arms 9 are pivotable upwardly and downwardly about aligned pins 10 which are located very close to the front of the frame portion 1 with respect to the direction A and which define a substantially horizontal axis that is substantially perpendicular to the direction A. The arms 9 are formed with single holes at locations spaced rearwardly from the pins 10 and these holes can be brought into register with chosen holes in curved rows thereof that are formed in vertically disposed sector-shaped plates 12 secured to the opposite lateral ends of the frame portion 1. Horizontal locking pins 11 are provided for entry through the single holes in the arms 9 and through chosen holes in the plates 12 to retain said arms 9 in corresponding angular settings about the axis defined by the pins 10.

A rotary supporting member 13 which has the general configuration of a ground roller is mounted between the rearmost and lowermost ends of the two arms 9 and acts to sustain the implement during its travel over the ground in conjunction with the connection between the coupling member 7 and the three-point lifting device or hitch of the operating tractor or other vehicle. It will, of course, be realised that the level of the axis of rotation of the rotary supporting member or roller 13 relative to that of the frame portion 1 that is chosen by inserting the locking pins 11 in appropriate holes in the plates 12 is a principal factor in determing the depth of penetration of the tines of the rotary soil working members into the ground during the use of the implement.

The rotary supporting member or roller 13 extends throughout substantially the whole of the working width of the rotary soil working members and its axis of rotation $a$ (FIGS. 2 and 4) is substantially horizontally perpendicular to the direction A. A tubular support 14 whose longitudinal axis is coincident with the axis of rotation $a$ has stub shafts 15 rigidly secured to its opposite ends and these stub shafts 15 are rotatably journalled in substantially horizontal bearings 16 fixed to the arms 9. Each stub shaft 15 is rigidly mounted at the center of a corresponding substantially vertically disposed square plate 17. The square plate 17 can be passed through slightly larger square openings 18 that are formed in discs 19 at the ends of the tubular support 14 in such a way that the center of the openings 18 substantially coincide with the center of the discs. The plates 17 can be secured to the discs 19 by bolts 20 in the manner which can be seen best in FIG. 2 of the drawings by turning the plates 17 and discs 19 through substantially 45° relative to one another, after passing the plates through the openings 18, which turning movement bring the corners of the square plates 17 into register with regions of the discs 19 that are adjacent the midpoints of the four edges of each opening 18. Bolts 20 are then entered through registering holes in the corners of the plates 17 and the discs 19 to secure said plates 17 rigidly, but releasably, to the discs.

Six substantially cylindrical elements 21 are arranged alongside one another between the discs 19, said elements 21 each embracing the tubular support 14 with a considerable degree of clearance. Each element 21 is provided at its opposite ends with stop rings 22 that are made from material of strip formation, the stop rings 22 being of smaller diameter than the corresponding elements 21 but still being arranged around the tubular support 14 with a considerable degree of clearance. It is, in fact, preferred that each stop ring 22 should have a diameter whose magnitude is substantially twice that of the tubular support 14. the tubular support 14 is of circular cross-section but this is by no means essential and a regular polygonal cross-section could equally well be employed. With such a construction, the diameter of the support 14 is to be understood to be the diameter of the circle which circumscribes the regular polygon which is formed by taking a cross-section of the support. Each stop ring 22 is provided, at the end thereof that coincides with one end of the corresponding cylindrical element 21, with an annular plate 23 that is contained in a plane substantially perpendicular to the longitudinal axis of the corresponding element 21. Outer edge regions of the two annular plates 23 that correspond to each cylindrical element 21 are interconnected by eight tubular members 24 each of which extends substantially parallel to the longitudinal axis of the corresponding element 21 with said members 24 regularly spaced apart from one another at 45° intervals around the last-mentioned axis.

Figure 5:
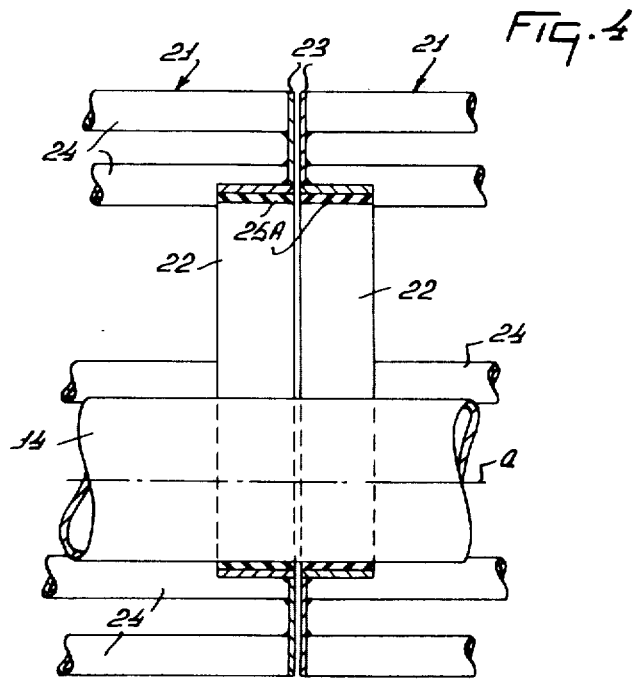

In the embodiment illustrated in FIGS. 1 to 4 of the drawings, the tubular support 14 is provided on its outer surface with a layer of elastic material 25 in the regions thereof that coincide with the stop rings 22 of the elements 21. As can be seen best in FIGS. 2 and 4 of the drawings, the outer surfaces of the elastic layers 25 co-operate rollingly with the inner surfaces of the stop rings 22 during the use of the implement. FIG. 5 of the drawings illustrates a generally similar construction except that, in this case, the concave inner surfaces of the stop rings 22 are provided with layers 25A of elastic material whereas the convex outer surface of the co-operating tubular support 14 is plain throughout its length. The layers 25 and 25A may be formed from natural or synthetic rubber or from a synthetic plastics material such as nylon or polyethylene.

FIG. 6 of the drawings illustrates a construction of the rotary supporting member 13 in which the tubular support 14 is provided with spool-like holders 26 that are of generally channel-shaped outline when seen in cross-section, said holders 26 being located in the regions of the support 14 that register with the stop rings 22. The holders 26 carry elastic tire-like members 27 whose outer surfaces co-operate rollingly with the concave inner surfaces of the stop rings 22 but said tire-like members 27 may, if desired, be replaced by several layers of an elastic tape suitably wound around the holders 26. FIG. 7 of the drawings illustrates a construction in which the stop rings 22 are replaced by circular stops 28 that are of channel-shaped laterally open cross-section. The construction is such that the limbs of the channel-shaped cross-section extend substantially parallel to the longitudinal axes of the cylindrical elements 21, the bases of said channels being located at the ends of the elements 21 with the limbs facing inwardly of those elements therefrom. The radially outer limbs of the stops 28 have the opposite ends of the tubular members 24 rigidly secured to them in this embodiment and it will be seen from FIG. 7 of the drawings that said ends are flattened for that purpose.

FIGS. 8 and 9 of the drawings illustrate the provision of a rotary supporting member which comprises three groups of tubular elements 29 each of which elements extends substantially parallel to the axis of rotation $a$ at the circumference of the supporting member or roller. The elements 29 of each group are pivotally connected to the central tubular support 14 by substantially radially extending arms 30. The support 14 is, to this end, surrounded by a number of annular rings 32 to which rings the arms 30 are turnably coupled by pivot pins 33 whose axes extend substantially parallel to the axis of rotation $a$. The radially inner ends of the arms 30 are shaped to afford stops 34 and coil springs 35 wound around the pivot pins 31 so as to bear between said arms 30 and the rings 32 act to turn the arms 30 about said pins 33 in such a direction as to urge the stops 34 into contact with the outer convex surface of the tubular support 14. The elements 29 and the arms 30 which carry them can, however, turn rearwardly with respect to the direction A in anti-clockwise directions about the axes of the pivot pins 33 as seen in FIG. 8 of the drawings when the corresponding elements 29 bear against the ground surface during the operation of the implement. It will also be noted from FIGS. 8 and 9 of the drawings that each group of elements 29 preferably comprises eight elements and that the elements 29 of neighbouring groups are angularly offset relative to one another about the axis of rotation $a$. This can be seen in FIGS. 8 and 9 of the drawings in respect of the elements 29 that are shown in cross-section in FIG. 8 and at the foot of FIG. 9 as compared with the elements 29 of a further group 31 of elements 29. FIG. 8 also shows the elements 29 of a third group located beyond the group 31.

FIGS. 10 and 11 of the drawings illustrate a rotary supporting member 36 in which the tubular shaft 14 at the center thereof is surrounded by a plurality of brackets 37 rigidly secured to the support 14 at regular intervals therealong. The brackets 37 are of substantially square configuration when viewed lengthwise of the axis of rotation $a$ (FIG. 10) and, at each flattened corner thereof, the apex of a corresponding helical spring 38 of conical formation is fastened to the bracket 37 by a corresponding substantially radially extending bolt 39. It will be seen from FIG. 10 of the drawings that the coincident longitudinal axes $b$ of two opposite conical springs 38 and the longitudinal axes of the corresponding fastening bolts 39 perpendicularly intersect the axis of rotation $a$ of the rotary supporting member 36. Each bracket 37 carries a group of four conical springs 38 and it will be seen from FIG. 10 of the drawings that the four springs 38 of each group are made in two integral neighbouring pairs from single lengths of spring steel wire or rod, portions 40 of the material that integrally interconnect the apices of the two springs 38 of a pair being disposed so as to extend substantially parallel to a neighbouring limb of the corresponding bracket 37. The longitudinal axes $b$ of the two conical springs of an integral pair are inclined at substantially 90° to one another and it will be seen from FIGS. 10 and 11 of the drawings that each group of four springs 38 is turned through substantially 45° about the axis of rotation $a$ relative to the or each neighbouring group along the rotary supporting member 36. Thus, as seen in FIG. 10 of the drawings in a direction parallel to the axis of rotation $a$, each conical spring 38 of one group is located between two conical springs 38 of the next group. Each alternate group of four springs 38 thus occupies substantially the same angular setting around the axis of rotation $a$ as can be seen in outline in FIG. 11 of the drawings.

FIGS. 12 and 13 of the drawings illustrate a construction in which a rotary supporting member 41A has a central tubular support 41 in the form of a beam of square cross-section, the center line of said tubular support 41 once again coinciding with the axis of rotation of the rotary supporting member 41A. Strip-shaped brackets 42 are welded or otherwise secured to the four sides of the support 41 in such a way that one end of each of them projects beyond the side to which it is secured. A bolt 43 and a co-operating clamping plate are employed releasably to secure a hairpin-shaped connecting portion 44 of a corresponding integral pair of tines 45 to each bracket 42. Each pair of tines 45 is formed integrally from a single length of spring steel wire or rod and comprises the hairpin-shaped connecting portion 44 that extends in abutting and parallel relationship with the corresponding bracket 42, helically wound coils 46 that lie against the corresponding support 42 and connect the portion 44 to approximately radially extending portions 47 whose ends remote from the coils 46 merge into curved terminal portions 48 whose centers of curvature substantially coincide with the axis of rotation of the rotary supporting member 41A that is afforded by the stub shafts 15 (FIG. 12). It can be seen from FIG. 13 of the drawings that the strip-shaped brackets 42 are secured to the four sides of the support 41 in regular spaced apart rows but that the brackets 42 in each row are staggered in position lengthwise along the support 41 relative to the brackets 42 of the neighbouring rows. It will be apparent that the terminal portions 48 of the tines 45 make supporting engagement with the ground surface during rotation of the member 41A and that their resilient formation and connection to the brackets 42 allows them to move to an appreciable extent in the substantially cylindrical skeletal outer surface of the supporting member 41A which they together define.

FIGS. 14 and 15 of the drawings illustrate a rotary supporting member 49 whose centrally disposed tubular support 14 is surrounded in spaced relationship by a helically wound element 50 formed from spring steel of circular cross-section. It is preferred that the diameter of the helix afforded by the element 50 should not be less than substantially 25 centimeters. Substantially radial supporting arms 51 project from the tubular support 14 at substantially 480° intervals as regards the helical winding of the element 50 round the axis of rotation $a$. Considered in another way, there are arms 51 at intervals of 1 and ⅓ complete turns of the element 50 around the axis of rotation $a$. It will be seen from the drawings that the arms 51 taper in a radially outward direction from the tubular support 14 but that their radially outermost ends are provided with releasable clamping brackets 52 that are tightened around the element 50 with the aid of small bolts or the like. The pitch of the helix defined by the element 50 is substantially half the diameter of the helix.

FIGS. 16 and 17 of the drawings illustrate a rotary supporting member 53 whose central tubular support 14 is provided adjacent its opposite ends and at regular intervals therealong with a number of circular discs 54 each of which is contained in a corresponding plane that is substantially perpendicular to the axis of rotation $a$ but each of which also has a perpendicularly bent-over outer rim 55 that extends, when seen in cross-section (FIG. 16), substantially parallel to the axis of rotation $a$. The outer convex surfaces of the rims 55 afford supporting faces for a sleeve 56 of elastic material that is fastened to the rims 55 of only the two discs 54 that are located adjacent the opposite ends of the tubular support 14 by a number of small substantially radially extending bolts 57. During the operation of an implement fitted with a rotary supporting member of the kind described with reference to FIGS. 16 and 17 of the drawings, the portions of the sleeve 56 that are located between the discs 54 can move to and fro towards the central tubular support 14 and otherwise flex so as to tend to shed any adhering soil.

FIG. 18 of the drawings subatantially corresponds to FIG. 1 thereof but shows the implement fitted with a rotary supporting member 57A which comprises nine low-pressure tires 58 mounted on the tubular support 14 in regularly, but closely, spaced apart relationship. Each tire 58 has an effective width in a direction parallel to the longitudinal axis of the tubular support 14 so that is not less than approximately its own diameter, said diameter preferably having a minimum magnitude of 30 centimeters. Each low-pressure tire 58 is freely rotatable about the axis of the support 14 independently of the other tires 58.

In the use of an implement of one of the kinds that have been described, its coupling member 7 is connected to the three-point lifting device or hitch of an agricultural tractor or other operating vehicle in the generally known manner which can be seen in outline in FIG. 1 and 18 of the drawings. The rotary input shaft 5 of the gear box 4 is placed in driven connection with the power-off shaft of the same tractor or other operating vehicle by way of the intermediate telescopic transmission shaft 6 that has universal joints at its opposite ends and, when the implement is moved operatively over a field, the tines of its overlapping rotary soil working members will work a strip of land having a width substantially equal to the length of the frame portion 1 measured in a horizontal direction perpendicular to the direction A. The rotary supporting member immediately follows the soil working members, and as previously mentioned, partly sustains the implement in position above the ground surface and governs, by its height relative to that of the frame portion 1, the depth of penetration of the soil working tines into the ground. Each of the various rotary supporting members that have been described above is provided at its groundengaging circumference with parts that are movable relative to a more or less central support. Such movement greatly minimises the tendency for mud and lumps of earth to adhere to the circumference of the rotary supporting member as it moves over a freshly worked strip of land. In the embodiments which have been described wth reference to FIGS. 1 to 6 of the drawings, the movable parts are constituted by the tubular members 24 which members can shift appreciably in position relative to the tubular support 14 during operation. Any earth that gets inside the stop rings 22 tends to be crumbled and dislodged from those rings by the support 14. The various layers 25 and 25A of elastic material and the tire-like members 27 or equivalent layers of elastic tape prevent a rapid rate of wear from taking place and also greatly reduce the amount of noise that is generated by the rotary supporting member, particularly during inoperative transport of the implement. Although not illustrated in the accompanying drawings, a single cylindrical element that extends throughout the width of the rotary supporting member may be employed in place of the plurality of neighbouring elements 21 that have been described and illustrated.

When a rotary supporting member of the kind described with reference to FIGS. 8 and 9 of the drawings is employed, the tubular elements 29 constitute the circumferentially movable parts of the member and can deflect relative to the tubular support 14 both substantially tangentially with respect to circles centred on the axis of rotation $a$ and towards and away from the support 14 to some extent. The stop 34 prevent the springs 35 from turning the arms 30 too far back about the pivots 33 and it has been found that the constant pivotal movements of the elements 29 that are produced during rotation of the supporting member substantially prevent the interior thereof from becoming filled with earth. The staggered relationship of the various groups of elements lengthwise along the support 14 tends to prevent the supporting member from rotating in a jerky and noisy manner.

When the embodiment illustrated in FIGS. 10 and 11 of the drawings is employed, the broad base ends of the conical springs 38 constitute the circumferentially arranged movable parts of the rotary supporting member and it has been found that the constant resilient movements of the springs 38 that are produced during rotation effectively prevent long-term adhesion of mud and other wet earth and also prevent the rotary supporting member from becoming internally clogged by mud and the like. Once again, the relatively staggered arrangement of neighbouring groups of four springs 38 around the axis of rotation $a$ ensure that the supporting member rotates steadily and evenly without producing any appreciable jerking or jolting.

In the embodiment of FIGS. 12 and 13 of the drawings, the curved terminal portions 48 of the tines 45 constitute the parts that are movable relative to the substantially central support 41. Said portions 48 are connected to the brackets 42 through the intermediary of the coils 46 and the constant resilient movements of said portions 48 and the other parts of the tines 45 that are produced during rotation of the supporting member 41A effectively prevent long-term adhesion of any appreciable quantities of mud or the like. The staggered arrangement of the tines 45 in the four rows thereof that extend along the tubular support 41 ensure substantially jerkfree rotation of the member 41A so that there is no interference with the even operation of the implement.

In the embodiment illustrated in FIGS. 14 and 15 of the drawings, the helically wound resilient element 50 can move to some extent relative to the support 14 and the constant resilient displacements thereof that are produced during operation stop the supporting member 49 from becoming filled with mud or other earth between the element 50 and the central support 14. In the embodiment of FIGS. 16 and 17 of the drawings, the elastic sleeve 56 can flex inwardly and outwardly towards and away from the central support 14 and to a lesser extent in a direction substantially parallel to the axis of rotation $a$. Such movements are constantly produced during the operation of an implement incorporating the supporting member 53 and they effectively prevent the adherence of any appreciable quantities of mud or other wet earth for any length of time.

When the rotary supporting member 57A shown in FIG. 18 of the drawings is employed, the treads of the low-pressure tire 58 afford the circumferential parts of said member that are movable relative to the substantially central support 14. The constant flexing of the tire 58 in various directions is again effective in preventing the long-term adhesion of any appreciable amounts of mud or other wet soil.

Although various features of the implements that have been described and/or illustrated in the accompanying drawings will be set forth in the following claims as inventive features, it is emphasised that the invention

What I claim is:

1. A cultivator comprising a frame with a plurality of soil-working members rotatably mounted on said frame and an elongated rotary member connected to said frame, said rotary member including a substantially central support having a longitudinal axis that forms the axis of rotation of said rotary member, an outer ground engaging circumference operatively associated with said central support and radially movable with respect to that support, said central support being rotatably connected to arms which are pivoted to said frame and said outer circumference comprising a plurality of elongated members which substantially coextend with said central support, said elongated members being mounted on at least one apertured annular member having an opening that receives said central support with substantial clearance, the diameter of said central support being substantially less than that of said opening of the annular member, whereby substantial radial movements of said annular member with said elongated members occurs with respect to said central support during the rotation of said rotary member.

2. A cultivator as claimed in claim 1, wherein said elongated members are rectilinear in configuration and are equidistantly spaced apart from one another around the circumference of said annular member.

3. A cultivator as claimed in claim 1, wherein said elongated members extend substantially parallel to the longitudinal axis of said central support along substantially the entire axial length of said rotary member.

4. A cultivator as claimed in claim 1, wherein the diameter of the opening of the annular member is at least twice that of said central support.

5. A cultivator as claimed in claim 1, wherein the external surface of said central support has a layer of elastic material that engages ring means on said annular member and said ring means encircles said opening.

6. A cultivator as claimed in claim 5, wherein there are a plurality of annular plates each of which has a stop ring that encircles a corresponding opening, said central support having a layer of elastic material only in the areas that engage each stop ring.

7. A cultivator as claimed in claim 1, wherein the said annular member is a plate having a stop ring that defines said opening, said ring having an internal surface of elastic material.

8. A cultivator as claimed in claim 1, wherein said central support is a hollow beam.

9. A cultivator as claimed in claim 1, wherein said rotary member is pivoted to said frame with a pair of arms having adjustment means and the latter is fixable to said frame to vertically adjust the position of the rotary member with respect to the remainder of said cultivator.

10. A cultivator as claimed in claim 1, wherein said soil-working members are arranged in side-by-side relationship and rotatable about upwardly extending axes.

11. A cultivator comprising a frame having an elongated frame portion extending transverse to the direction of travel, a plurality of soil-working members rotatably mounted about upwardly extending axes, an elongated ground engaging rotary member connected to said frame and located to the rear of sais frame portion, said elongated member including a substantially central support whose longitudinal axis forms the axis of rotation of said rotary member, and an outer ground engaging circumference comprising a plurality of elongated members which coextend generally with said central support, said elongated members being secured on at least one annular member having a stop ring which contacts and surrounds said central support with substantial clearance, the inner diameter of said ring being substantially larger than the diameter of said central support whereby substantial radial movements of said outer circumference can occur with respect to said central support.

* * * * *